July 28, 1936.  C. S. LARSON  2,048,937
ENAMELING MACHINE
Filed Aug. 13, 1932   4 Sheets-Sheet 1
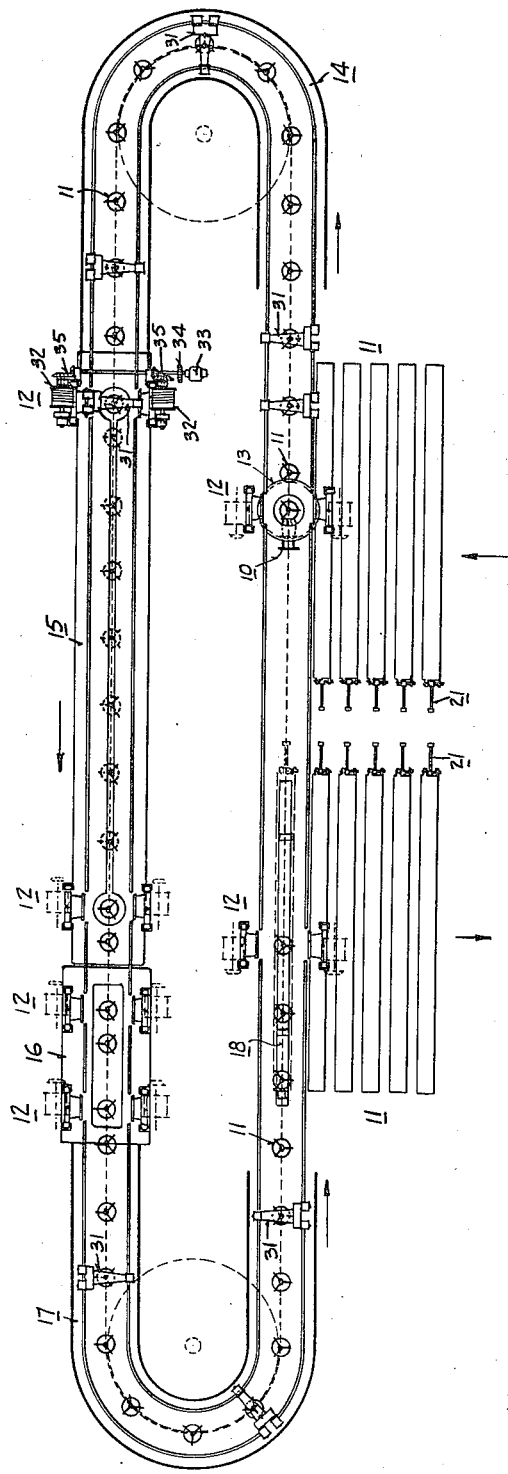
INVENTOR.
Clas S. Larson
BY
ATTORNEY.

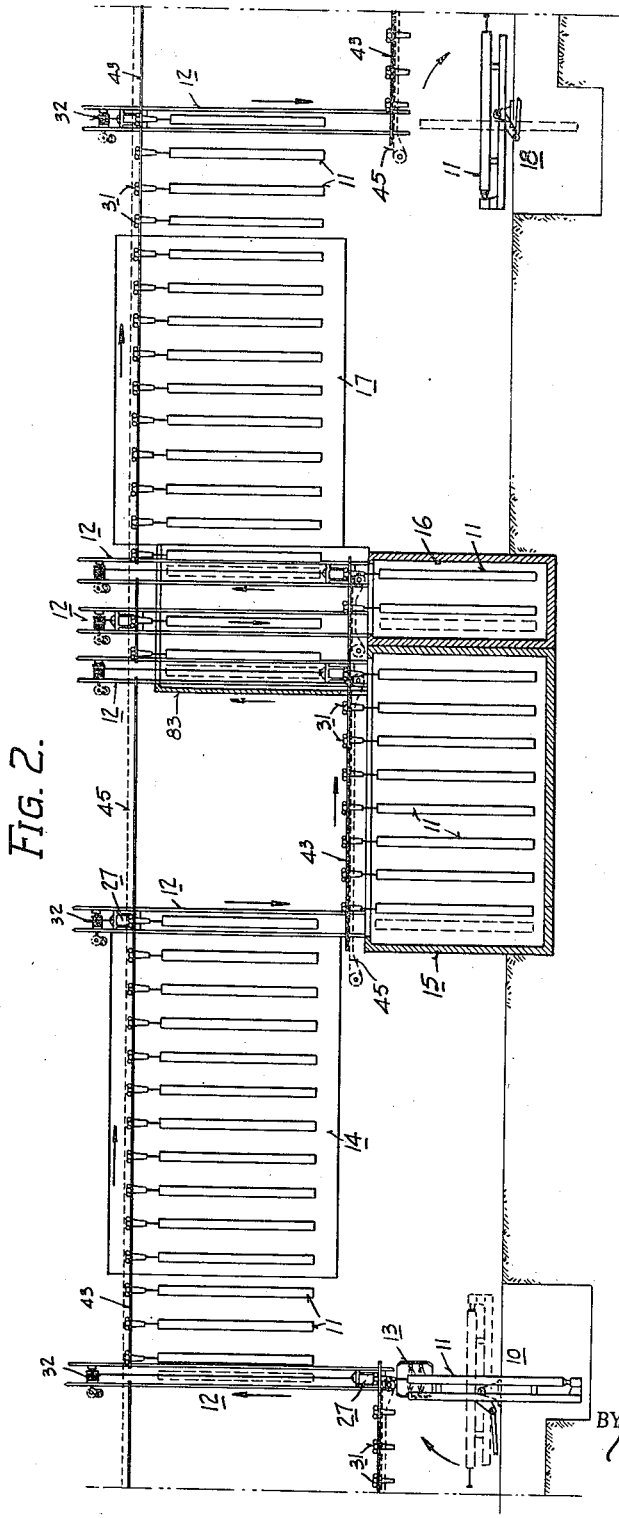

July 28, 1936.  C. S. LARSON  2,048,937
ENAMELING MACHINE
Filed Aug. 13, 1932   4 Sheets-Sheet 3
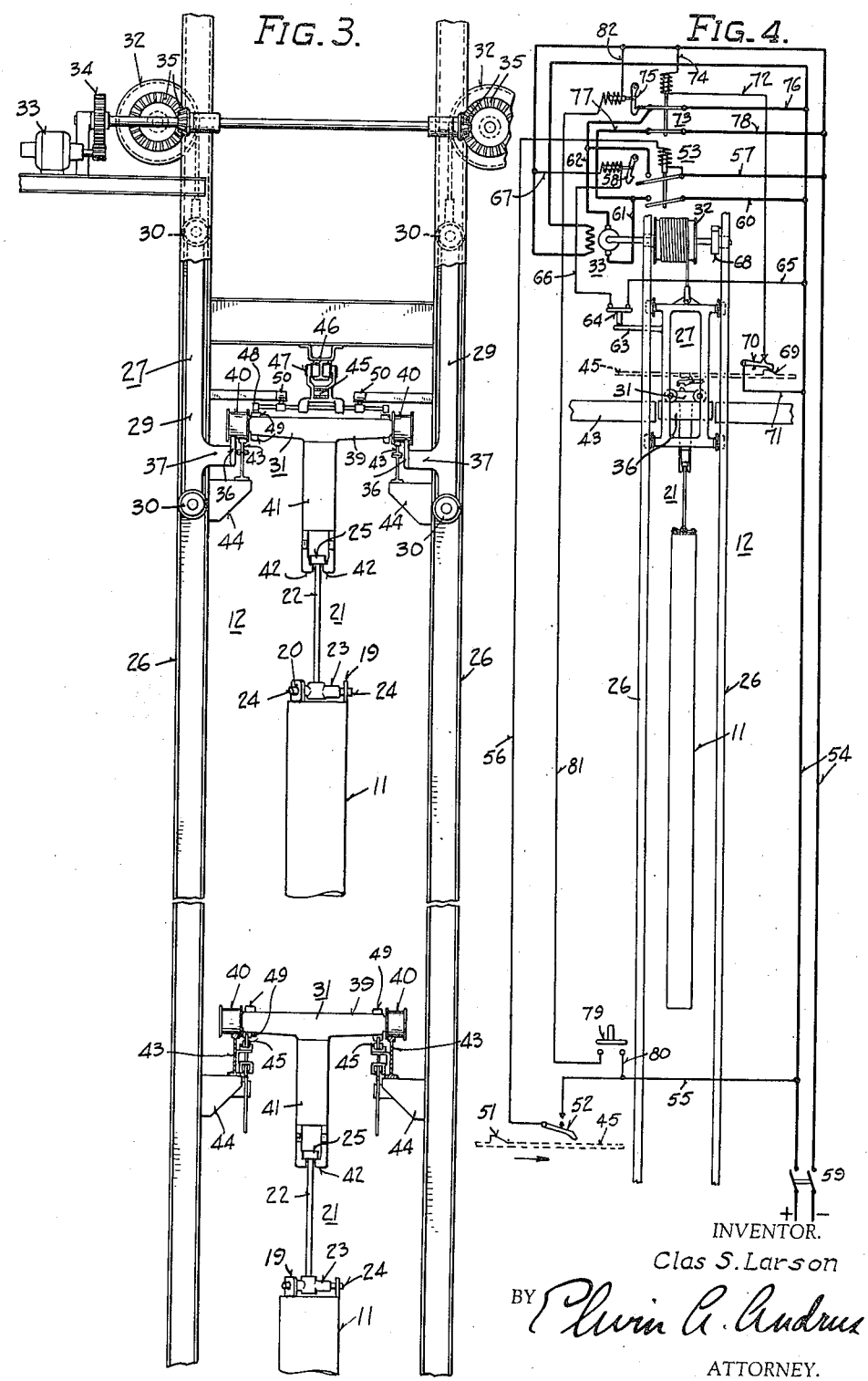
INVENTOR.
Clas S. Larson
BY
ATTORNEY.

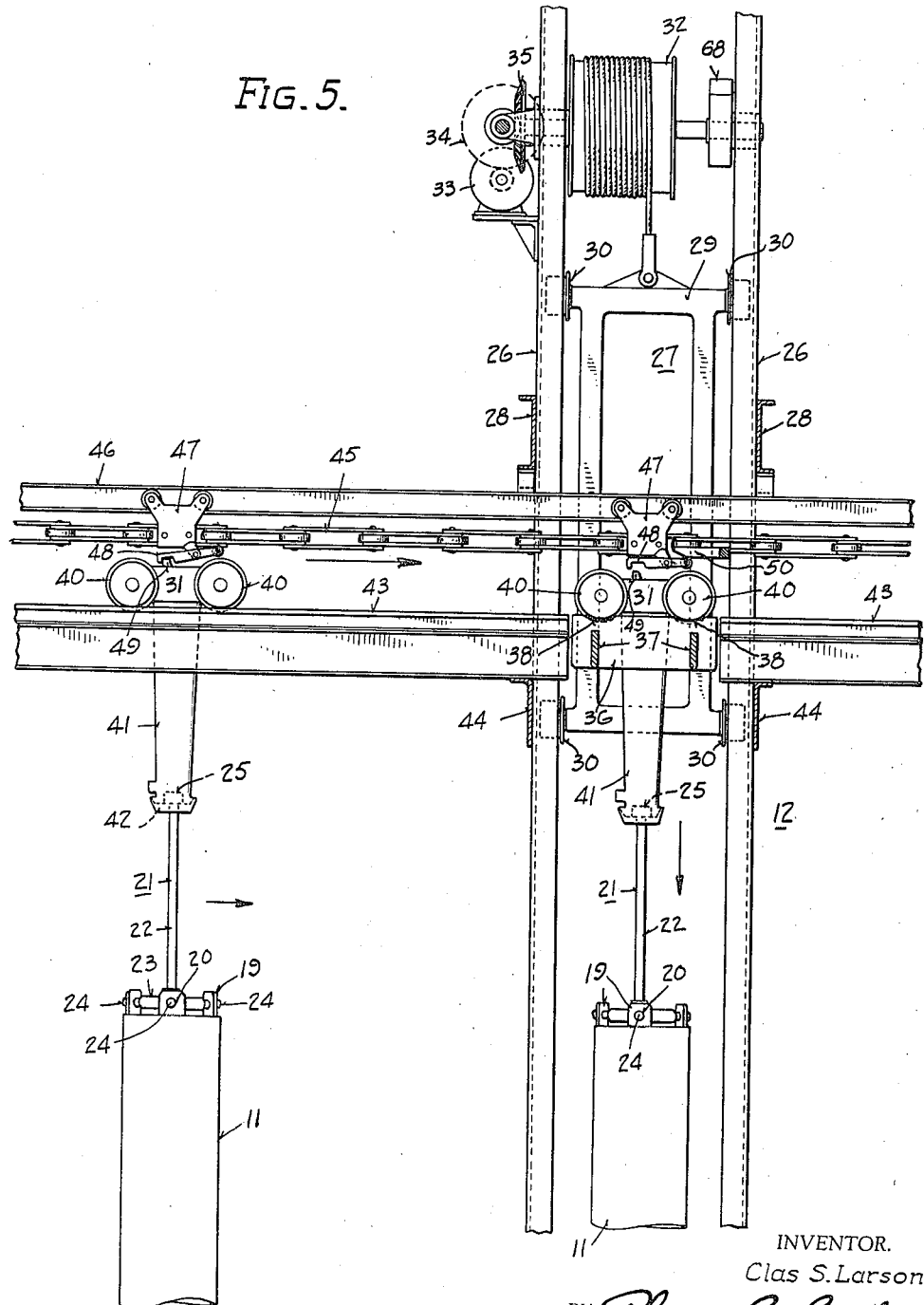

Patented July 28, 1936

2,048,937

UNITED STATES PATENT OFFICE 2,048,937

ENAMELING MACHINE

Clas S. Larson, Milwaukee, Wis., assignor to A. O. Smith Corporation, Milwaukee, Wis., a corporation of New York Application August 13, 1932, Serial No. 628,654

10 Claims. (Cl. 91—55)

This invention relates to enameling machines primarily intended for the enameling of heavy metal articles.

The object of the invention generally stated is the provision of an enameling machine for heavy metal articles that shall be simple and efficient in construction and readily and economically operated.

A more specific object of the invention is to provide for supporting pipe and the like in a vertical position and moving it along vertical and horizontal lines to carry it through an enameling machine with the surface to be enameled continuously and completely exposed.

It is also an object of the invention to provide for automatically transferring the pipe from one carrying means to another as it is moved through the enameling machine to effect the subjecting of it to the proper treating operations.

For a fuller understanding of the nature and objects of the invention, reference should be had to the following detailed description taken in connection with the accompanying drawings, in which:

Fig. 1 is a top plan view of an enameling machine constructed in accordance with my invention;

Fig. 2 is a view in development of the machine illustrated in Fig. 1;

Fig. 3 is a view in end elevation, parts being broken away, of an elevator suitable of moving the pipe along vertical lines in the enameling machine;

Fig. 4 is a diagrammatic view showing the control circuit connections for the operating motor of the elevator; and Fig. 5 is a view partly in side elevation and partly in section of the elevator and conveyor system shown in Fig. 3.

The enameling and treating of heavy metal articles such as large steel pipe presents problems that have not been heretofore considered in the enameling art. In order to perform successful enameling operations, the pipe has to be supported in a position to expose continuously and completely the surface to be enameled. Further, in the fusing of the enamel, the pipe or other article is heated to high temperatures which generally reach about 1650° F. Since the critical temperature for steel is lower than the fusing temperature of the enamel, the strength of the pipe is greatly reduced and the supporting of it in a manner to avoid distortion becomes a problem.

In fusing the enamel, where the pipe is heated to a temperature which is above the critical temperature of steel, advantage is taken of this heating and the pipe is quenched in a manner to bring about a change in the metal structure which will give a product having a high tensile strength. The quenching is preferably carried on at a rate which will produce sorbite and troostite in the metallographic structure of the steel.

Referring to Figs. 1 and 2 in particular, the machine comprises a loading cradle 10 which delivers the pipe 11 in a vertical position to the first elevator 12 to be transported while retained in a vertical position through the spraying booth 13. The system for carrying the pipe through the other treating chambers which comprises a number of parts will be described in greater detail hereinafter.

The spray booth 13 is provided for applying a coating of enamel of the proper consistency to the surface of the pipe. Many different types of spray booths may be utilized with success. The coating of enamel may be applied by using a single spray and rotating the pipe while the spray or pipe is moved along vertical lines or by means of nozzles arranged circumferentially of the pipe.

In the process of moving the pipe upwardly through the spray booth 13 by means of the elevator 12, it is elevated to the proper level for delivery to a preheating chamber 14 for drying the enamel and preheating the steel. The elevator 12 is a part of the system for carrying the pipe through the machine. In this particular embodiment of the invention, six elevators are provided which are similar in construction to 12 and which will be described in detail with reference to Figs. 3, 4, and 5.

After the preheating of the pipe and drying of the enamel is completed, it is lowered into a furnace 15 by means of another elevator which receives the pipe when it reaches the end of the preheating chamber. This elevator for delivering the pipe to the furnace is operated in timed relation with the other parts of the system in a manner to be described hereinafter.

The pipe is then moved along horizontal lines at a predetermined rate which will permit the proper fusing of the enamel as it passes from one end to the other of the furnace.

When the fusing operation has been completed, the pipe is delivered to a third elevator which lifts it vertically out of the furnace 15. The pipe is again moved along horizontal lines while retained in a vertical position and delivered to a fourth elevator which lowers it into a quenching bath 16.

The pipe is transferred from the fourth elevator to the fifth in the quenching bath, this operation being effected by moving the pipe supporting means along a horizontal track.

The pipe is removed from the quenching bath by moving it along vertical lines and it is then delivered to the cooling chamber 17 through which it is moved at a predetermined rate and along horizontal lines. When the pipe reaches the end of the chamber 17, it is received by the sixth and last elevator and lowered into the unloading cradle 18 which rotates it into a horizontal position ready for discharge to the roll tables provided for carrying it out of the machine.

From the foregoing it will be seen that the heavy pipe may be moved through the machine by carrying it along vertical and horizontal lines while maintaining it in a vertical position. The weight of the pipe is suspended along longitudinal lines and it is not subjected to pressures which tend to distort it. Therefore, pipe weighting 1,000 and 1,500 pounds may be handled. In fact, any size of commercial pipe may be handled.

In order to support the pipe 11 in a vertical position lugs 19, shown best in Fig. 5, are welded to one end. These lugs may be welded to the pipe by means of arc welds or flash welds.

As shown, the lugs 19 are provided with openings 20 for receiving the pins of a hanger 21. After the enameling operation has been completed and the pipe treated, the lugs 19 may be readily severed from the pipe by any suitable cutting process.

Any suitable hanger may be utilized. The hangers 21, shown in Figs. 3 and 5 have been found satisfactory and comprise a shank 22 provided with radiating sleeve arms 23 at its lower end. Pins 24, which engage in the openings 20 provided in the lugs 19, are mounted in the arms 23. In order to suspend the hanger 21 from an elevator 12, a head 25 is provided on the upper end of the shank 22.

The system referred to comprises trucks for receiving the hangers 21 provided for suspending the pipe 11, elevators for moving the trucks and pipe along vertical lines to transport them from one level to another, horizontal tracks extending from one elevator to another, and means for moving the trucks along the horizontal tracks to transport the pipe from elevator to elevator.

The elevators 12 referred to hereinbefore comprise a plurality of vertical guide rails 26 and a car mounted in the guide rails for movement along vertical lines. In this particular construction, channel members are utilized as guide rails and four are provided for each of the elevator cars 27. The guide rails may be supported in any suitable manner and in this case they are attached to the beams 28 of a separate steel structure erected in the building provided for housing the machine.

The elevator cars are quite different in construction from the usual elevator car. As shown, they comprise two frames 29 each of which is provided with a plurality of small wheels 30 which travel in the channel shaped vertical guide rails 26. No connecting members are provided between the frames 29 because in transferring the truck from one position to another, the elevator frames pass outside of the lower rails in order to deposit the trucks 31 on rails extending between treating chambers.

The frames 29 of each elevator car 27 are actuated by means of a pair of power operated cable drums 32. In order to operate both drums together, a common drive is provided. In this particular instance, the drums are operated from a motor 33 through a reduction gear train 34 and bevel gears 35. Any suitable variable speed type of motor may be used for operating the drums.

As shown in Figs. 3 and 5, a short section of rail 36 is mounted on each frame 29 of the elevator car. These rail sections 36 are supported on the frames by means of brackets 37 which extend inwardly. The rail sections on the frames are provided with depressions 38 for receiving the wheels of the trucks 31 to hold them in position on the cars 27. The rail sections 36 on the elevator cars are spaced apart far enough to pass outside of the rails 43 at the lower levels.

The truck 31 referred to hereinbefore is provided for supporting the pipe 11 and carrying it through the different treating chambers. In this instance the truck comprises a frame 39 carried by three wheels 40, two on one side and one on the other. A truck supported on three wheels has been selected since it more readily rides around the curved tracks illustrated in Fig. 1. A tubular member 41 which depends from the truck is slotted at its lower end and provided with inwardly extending flanges 42 for receiving and supporting the head 25 of the hanger 21.

In designing the machine and adjusting it for operation, the loading cradle 10 will be so disposed that when it rotates a pipe into the vertical position, it will seat the head 25 of the hanger 21 on the flanges 42 of the truck located on the first elevator. Ordinarily in designing the machine, it will be constructed to operate on a pipe of predetermined length. However, provision may be made for adjusting the pipe handling units to set them for pipe of different lengths.

Rails 43 are disposed in horizontal planes between the elevators 12 and may be supported on the building frame or on brackets 44 carried by the elevator guide rails. The rails are disposed in proper relation to the different treating chambers through which the pipe is to be moved.

The wheels 40 of the truck 31 are each provided with two flanges. The inner flanges engage the rails 43 extending between elevators and prevent lateral movement of the truck when traveling on these rails. The outer flanges of the wheels 40 are disposed to engage the rail sections 36 provided on the elevator cars 27. The wheels 40 are wide enough to straddle the rails on the elevator car 31 and the rails 43 at the lower level.

A plurality of endless chains 45 are provided in conjunction with the rails 43 for moving the trucks 31 from one elevator shaft to another through the treating chambers. A section of the chain is best shown in Fig. 5. The upper chain is supported on I-beams 46 by means of small trolleys 47. The trolleys are of any well known type having four wheels which ride on the lower flange of the I-beam. The lower chains 45 are provided in pairs and mounted on vertical sprocket wheels. Channel members are utilized for supporting the lower chains.

Dogs or hooks 48 are pivotally mounted on the trolleys 47 and disposed to engage projections 49 provided on the trucks 31. In some instances, the projections 49 are provided on the tops of the frames 39 of the trucks, while in other cases they depend from the frames 39. When the trucks are engaged by the dogs 48, they are transferred from an elevator to the horizontal rails and delivered to another elevator. When a truck reaches the elevator to which it is to be delivered, the dogs 48 are tripped by cams 50.

As shown in Fig. 3, two dogs 48 are provided on the chain 45 at each trolley 47. This is to assure that the propelling force will be applied to the trucks 31 on both sides of the depending member provided for carrying the pipe.

Assuming now that the first elevator car stands in its lowermost position, that a truck 31 has been delivered thereto, that the loading cradle operating in proper timed relation with the chain 45 has loaded a pipe onto a truck 31, then shortly after the loading of the pipe onto the truck, a cam 51 provided on the chain 45 closes a switch 52 for a short time to establish an actuating circuit for the two pole switch 53, see Fig. 4.

The elevator starting circuit is connected across a power source which, in this case, is a pair of line conductors 54. The current flows from the positive line conductor through conductor 55, switch 52, conductor 56, the actuating coil of switch 53 and conductor 57 to the negative line conductor. The switch 53 is actuated to its upper or closed position and engaged by the electromagnetically operated latch 58.

The field of the motor 33 is connected across the line conductors 54 when the operator starting the machine closes switch 59. The actuation of the switch 53 to its closed position connects the armature of the motor across the line conductors 54, the circuit extending from the positively energized line conductor 54 through conductor 60, switch 53, conductor 61, the armature of the motor, conductor 62, switch 53 and conductor 57, back to the negative line conductor 54. The motor is operated and raises the elevator car 27 to its upper level. When the elevator car reaches its uppermost position, an arm 63 carried thereby actuates the switch 64, establishing a circuit which may be traced from the positive line conductor 54 through conductor 65, switch 64, conductor 66, the actuating coil of the electromagnetically operated latch 58, and conductor 67 to the negative line conductor 54. The switch 53 is released and drops to its lower or open position. In this manner, the armature circuit of the motor 33 is interrupted and the motor stopped.

Electromagnetically operated brakes such as shown at 68 are provided for retaining the elevator cars at the different levels. These brakes may be arranged to be released when the motor circuit is closed and the motor takes the load and to be applied as soon as the motor circuit is interrupted, in accordance with standard practice. Since brake circuits of this kind are well known in the art, they have not been shown in the drawings.

The truck 31, which has been elevated to the upper level, is engaged by a dog 48 provided on the upper chain 45 and transferred from the first elevator through the preheating chamber 14 to the second elevator. The upper and lower chains 45 are driven from a common drive and are disposed to move in a predetermined timed relation with one another.

Since means is provided on the chains 45 for initiating the operation of the elevators from one level to another, the elevators also operate in timed relation with the conveyor chains. Thus, the whole system operates in synchronism.

Therefore, when the truck 31 has passed through the preheating and drying chamber and arrived at the second elevator, an elevator car is in position to receive it.

When the truck 31 is loaded onto the second elevator car, a cam 69 provided on the upper chain 45 closes the switch 70 for a short period of time to establish a circuit which extends from the positive line conductor 54, through conductor 71, switch 70, conductor 72, the actuating coil of switch 73, and conductor 74 to the negative line conductor. The switch 73 is actuated to its upper or closed position and engaged by the electromagnetically operated latch 75. Another motor armature circuit is established which extends from the positive line conductor, through conductor 76, the upper pole of switch 73, conductor 62, the armature of the motor 33, conductors 61 and 77, the lower pole of switch 73, and conductor 78, to the negative line conductor 54. Upon the establishment of this armature circuit, which energizes the armature in the reversed direction from the armature circuit previously traced, the second elevator car is moved downwardly.

Further, upon the establishment of the armature circuit for moving the car downwardly, the brake 68 is released. As stated hereinbefore, the operation of the brakes of the motor circuit is in accordance with standard practice and the circuits have not been shown in the drawings.

When the elevator car 27 reaches the lower level, the pipe is suspended in the furnace. The arm 63 of the car 27 engages a switch 79 disposed at the lower end of the elevator shaft and establishes an actuating circuit for the electromagnetically operated latch 75. This circuit may be traced from the positive line conductor 54 through conductors 55 and 80, switch 79, conductor 81, the actuating coil of the electromagnetically operated latch 75, conductor 82, to the negative line conductor 54.

The switch 73 is released and drops to its lower or open position, interrupting the armature circuit and applying the brake 68. The elevator car 27 stands at the lower level with the rail sections 36 in substantially the same horizontal plane with the rails 43 disposed above the furnace 15. The dogs provided on the furnace chain 45 engage the truck on the elevator car 27 and carry it across to the third elevator.

The operation of the third, fourth, fifth and sixth elevators is identical with that described for the first and second and need not be described further.

In order to prevent the cooling of the pipe through any considerable range of temperatures in transferring it from the furnace 15 to the quenching bath 16, a hood 83 is provided. As shown, this hood is provided with openings in the top through which the elevator may be operated. At the right side, as viewed in Fig. 2, an opening is provided so that the pipe may be carried along the horizontal rails 43 from under the hood and into the cooling chamber.

The loading and unloading cradles and the different elements of the conveyor system are operated in a predetermined timed relation so that a continuous line of pipe may be passed through the machine. The different speeds for the different members of the transferring system may be obtained from the drive in any well known manner and it is thought that there is no need for a detailed description.

Since various changes may be made in the above described construction and arrangement of parts and different embodiments of the invention may be made without departing from the scope thereof, it is intended that all matter contained in the above description or as shown in the accompanying drawings shall be interpreted as illustrative and not in a limiting sense.

I claim:

1. In an enameling machine having an enamel spray and a heat treating furnace, in combination, means for supporting a pipe in a vertical position to expose the whole of the surface to be enameled, means for moving the pipe along vertical lines to carry it through the spray and deliver it to the desired level for feeding it to the furnace, means for carrying the supporting means and the pipe along horizontal lines to the furnace, and means for lowering the pipe endwise into the furnace, thereby providing for a door of minimum size for feeding the pipe into the furnace.

2. In an enameling machine having an enameling spray, a heat treating furnace and temperature control chambers, in combination, means for supporting and conveying a pipe in a vertical position, said conveying means being disposed to carry the pipe through the enameling spray as it moves it along vertical lines to carry it to the desired level for delivering it to the furnace, means for carrying the pipe along horizontal lines to carry it to the furnace, means for moving the pipe along vertical lines to feed it endwise into the furnace, the endwise feeding of the pipe into the furnace permitting an opening of minimum size, means for giving the pipe a horizontal movement in the furnace to effect the desired heating, and means for moving the pipe along vertical lines to carry it out of the furnace and deliver it to a temperature controlling chamber.

3. In an enameling machine for enameling bodies of uniform section such as pipe, a treating chamber for heating the pipe, said chamber being of substantial length and of a height greater than the length of the sections of pipe being treated and having two vertical openings therein, one for receiving the pipe to be treated and one for withdrawing of the pipe, said openings being of a size little larger than the diameter of the pipe, means for vertically suspending a section of pipe, means supporting said suspending means for feeding the pipe in a vertical line through the inlet opening into said chamber, means for transferring said suspending means laterally to move the pipe horizontally through said chamber to the outlet opening, and means for withdrawing the pipe in a vertical line from said chamber through said outlet opening.

4. In an enameling machine for enameling bodies of uniform section such as pipe, an enamel spray booth having an opening vertically through its center, a furnace having two vertical openings therein of a size little larger than the diameter of the pipe, means for vertically suspending a section of pipe, means for moving the pipe longitudinally in a vertical direction through the opening in said spray booth to effect uniform spraying of enamel thereon, means for feeding the pipe in a vertical line through the inlet opening into said furnace, means for transferring said pipe laterally in said furnace, and means for withdrawing the pipe in a vertical line from said furnace through the outlet opening.

5. In an enameling machine for enameling bodies of uniform section such as pipe, an enamel spray booth having an opening vertically through its center, a furnace having two vertical openings therein of a size little larger than the diameter of the pipe, a chamber adjacent said furnace containing a quenching media for quenching said pipe, means for vertically suspending a section of pipe, means for moving the pipe longitudinally in a vertical direction through the opening in said spray booth to effect uniform spraying of enamel thereon, means for feeding the pipe in a vertical line through the inlet opening into said furnace, means for transferring said pipe laterally in said furnace chamber, means for withdrawing the pipe in a vertical line from said chamber through the outlet opening, means for transferring the pipe laterally to a position above said quenching chamber, means to lower said pipe vertically into said quenching chamber without lateral movement to effect uniform treatment of the pipe circumferentially and progressive treatment thereof longitudinally, and means for removing the pipe from said quenching chamber.

6. In an enameling machine for enameling bodies of uniform section such as pipe, a furnace having two vertical openings therein of a size little larger than the diameter of the pipe, a chamber containing a quenching media for quickly lowering the temperature of the pipe, means for vertically suspending a section of pipe, means for feeding the pipe longitudinally in a vertical line through the inlet opening into said furnace, means for transferring said pipe laterally in said furnace chamber, means for withdrawing the pipe in a vertical line from said furnace through the outlet opening, means for transferring the pipe laterally to a position above said quenching chamber, means to lower said pipe vertically into said quenching chamber without lateral movement to effect uniform treatment of the pipe circumferentially and progressive treatment thereof longitudinally, and means for removing the pipe from said quenching chamber.

7. In an enameling machine for enameling bodies of uniform section such as pipe, a furnace having two vertical openings therein of a size little larger than the diameter of the pipe, a chamber containing a quenching media for quickly lowering the temperature of the pipe, means for vertically suspending a section of pipe, means for feeding the pipe longitudinally in a vertical line through the inlet opening into said furnace, means for transferring said pipe laterally in said furnace chamber, and means for withdrawing the pipe in a vertical line from said furnace through the outlet opening and for lowering the pipe vertically into said quenching chamber without lateral movement to effect uniform treatment of the pipe circumferentially and progressive treatment thereof longitudinally.

8. In a machine of the class described, a main conveyor circuit adapted to convey vertically suspended sections of pipe through a horizontal path, a furnace for treating the pipe having a height greater than the length of the sections of pipe and disposed beneath the horizontal path of movement of said pipe, a separate conveyor for transferring vertically suspended sections of pipe horizontally within said furnace, means for lowering successive sections of pipe from the main conveyor to the furnace conveyor, means to raise treated sections of pipe from the furnace conveyor, to the main conveyor, and means for synchronizing the operation of said lowering and raising means with respect to said conveyors to effect continuous movement of the sections of pipe.

9. In a machine of the class described, a main conveyor circuit adapted to convey vertically suspended sections of pipe through a horizontal path, a furnace for treating the pipe having a height greater than the length of the sections of pipe and disposed beneath the horizontal path of movement of said pipe, a separate conveyor for transferring vertically suspended sections of pipe horizontally within said furnace, means for lowering successive sections of pipe from the main conveyor to the furnace conveyor, means to raise treated sections of pipe from the furnace conveyor to the main conveyor, a quenching bath of a depth greater than the length of the sections of pipe disposed beneath the horizontal path of movement of said pipe, a separate conveyor for transferring vertically suspended sections of pipe horizontally in said bath, means for lowering successive sections of pipe from the main conveyor to the quenching bath conveyor, means for raising quenched sections of pipe from the quenching bath conveyor to the main conveyor, and means for synchronizing the operation of said lowering and raising means with respect to said conveyors to effect continuous movement of the sections of pipe.

10. In a machine of the class described, a main conveyor circuit adapted to convey vertically suspended sections of pipe through a horizontal path, a furnace for treating the pipe having a height greater than the length of the sections of pipe and disposed beneath the horizontal path of movement of said pipe, a quenching bath of a depth greater than the length of the sections of pipe disposed beneath the horizontal path of movement of said pipe, a separate conveyor for transferring vertically suspended sections of pipe horizontally within said furnace, a separate conveyor for transferring vertically suspended sections of pipe horizontally in said bath, means for lowering successive sections of pipe from the main conveyor to the furnace conveyor, means for transferring successive sections of treated sections of pipe from said furnace conveyor to said quenching bath conveyor, means for raising quenched sections of pipe from said quenching bath conveyor to said main conveyor, and means for synchronizing the operation of said lowering, transferring and raising means with respect to said conveyors to effect continuous movement of the sections of pipe.

CLAS S. LARSON.